United States Patent [19]

Stanton et al.

[11] 4,223,994

[45] Sep. 23, 1980

[54] TYPESETTING TRANSPORT MECHANISM

[75] Inventors: Arthur J. Stanton, Satellite Beach; Meredith T. Raney, Melbourne; Ralph L. Parker, Melbourne Beach, all of Fla.

[73] Assignee: Harris Corporation, Cleveland, Ohio

[21] Appl. No.: 948,314

[22] Filed: Oct. 3, 1978

Related U.S. Application Data

[60] Division of Ser. No. 851,882, Nov. 16, 1977, abandoned, which is a continuation of Ser. No. 636,302, Nov. 28, 1975, abandoned.

[51] Int. Cl.$^3$ .............................................. G03B 29/00

[52] U.S. Cl. ........................................ 355/28; 355/40; 270/21

[58] Field of Search ........................................ 354/5-7, 354/11, 18, 19, 83, 89, 90, 307, 313, 312, 315, 319; 355/27-29, 97, 100, 113; 83/102, 105, 106, 371; 100/226-227; 270/21, 68 R

[56] References Cited

U.S. PATENT DOCUMENTS

| | | | |
|---|---|---|---|
| 3,557,675 | 1/1971 | Koll | 355/28 |
| 3,630,514 | 12/1971 | Del Vecchio | 270/83 |
| 3,710,698 | 1/1973 | Sinnott | 354/11 |
| 3,718,807 | 2/1973 | Bracken | 355/28 |
| 3,764,212 | 10/1973 | Bideau | 355/28 |
| 3,987,465 | 10/1976 | Sippel | 354/83 |

*Primary Examiner*—Edward M. Coven
*Assistant Examiner*—A. Heinz

[57] ABSTRACT

Transport apparatus for a phototypesetting system having input and output film buffers and a gating mechanism for selectively directing the film to either of several output stations.

5 Claims, 6 Drawing Figures

TYPESETTING TRANSPORT MECHANISM

This is a continuation, of application Ser. No. 851,882 filed Nov. 16, 1977, now abandoned, which is a continuation of application Ser. No. 636,302 filed Nov. 28, 1975, also now abandoned.

The present invention relates to the art of typesetting and more particularly to transport apparatus for phototypesetting mechanisms.

In the art of typesetting, a variety of automatic phototypesetting mechanisms are currently available. These systems operate to generate an optical beam for selectively exposing strips of film to produce alphanumeric characters thereon. The resulting exposed portions of film, or "galleys", may be produced sequentially on a continuous strip of film or, alternatively, may be generated individually on separate strips of film. Also, while the use of these systems for some purposes allows storage of the exposed film for later processing, others require that the film be processed immediately. In the latter case, valuable typesetting time may be lost if the previous galley must be completely processed before a new galley can be set.

In order to satisfy the varying needs of different uses of such machines, it is desirable to have a phototypesetting system which is flexible enough to meet these needs, and is still capable of continuously generating phototypeset material at a rapid rate.

It is therefore an object of the present invention to provide transport apparatus for a phototypesetting system which is operable in a variety of output modes.

It is another object of the present invention to provide apparatus which is capable of interfacing with a variety of output devices.

It is yet another object of the present invention to provide apparatus operable to produce either a continuous strip of selectively exposed film, or individual strips thereof.

In accordance with the present invention, apparatus is provided for receiving film from a phototypesetting station and for paying out such film to any one of a plurality of output means in accordance with the interfacing requirements thereof.

In accordance with a more limited aspect of the present invention, apparatus is provided having input and output buffer areas through which the exposed film is passed.

In accordance with another aspect of the present invention, a gating mechanism is provided for selectively directing the film to any of several output locations.

DESCRIPTION OF THE PREFERRED EMBODIMENT

Figure 1:
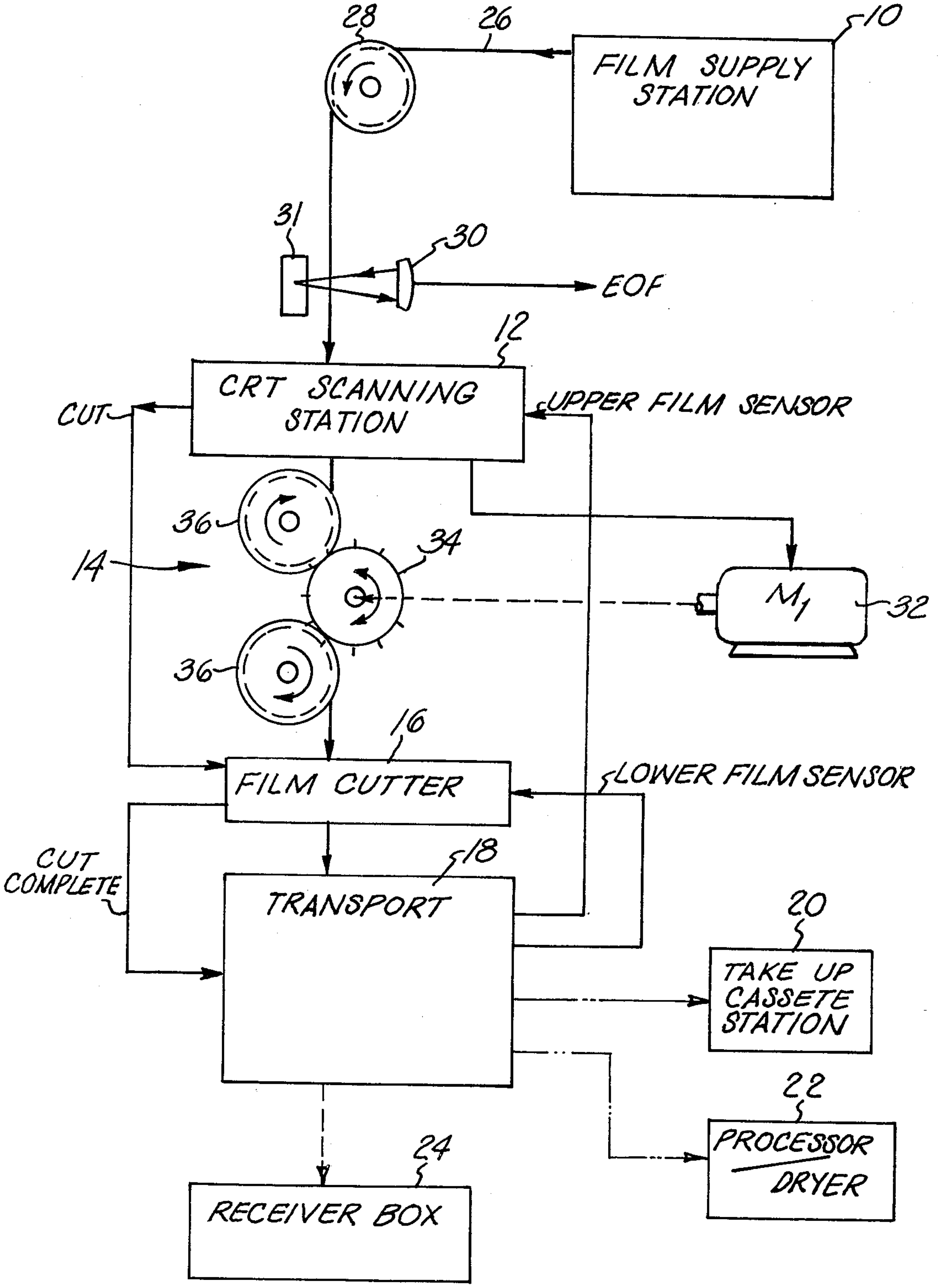
Figure 2:
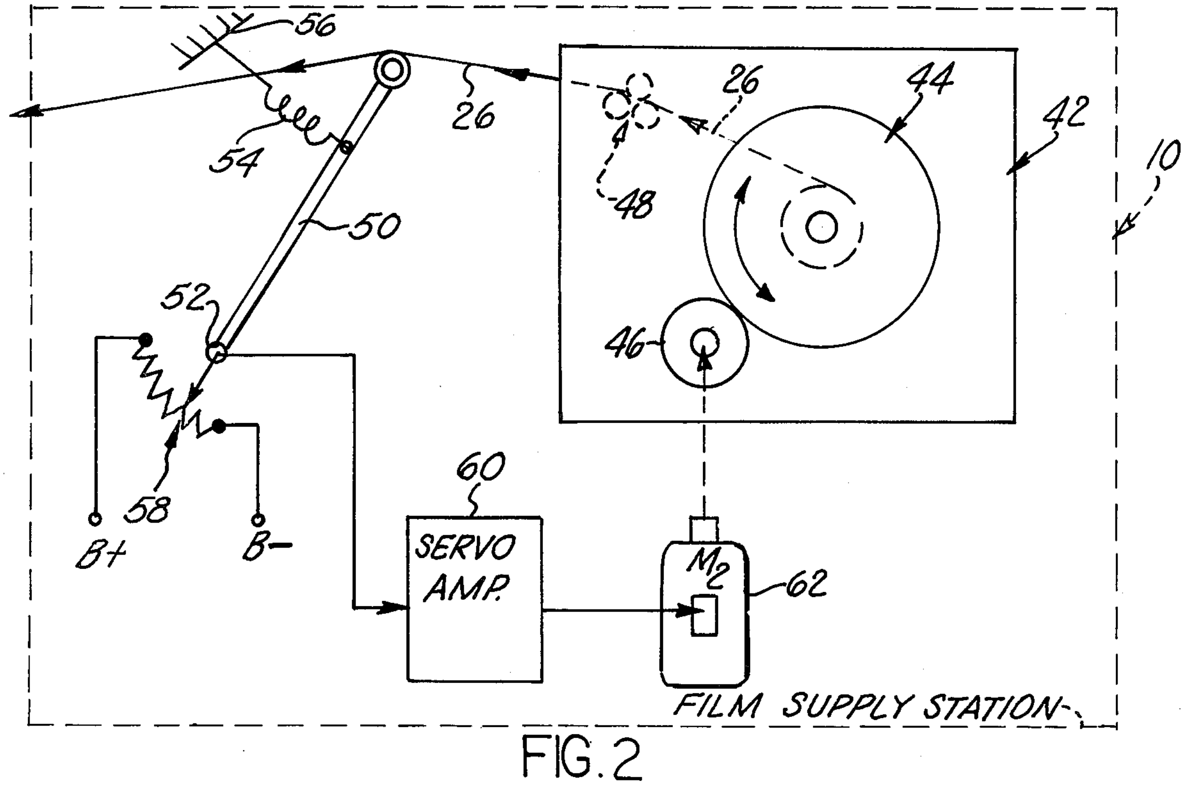
Figure 3:
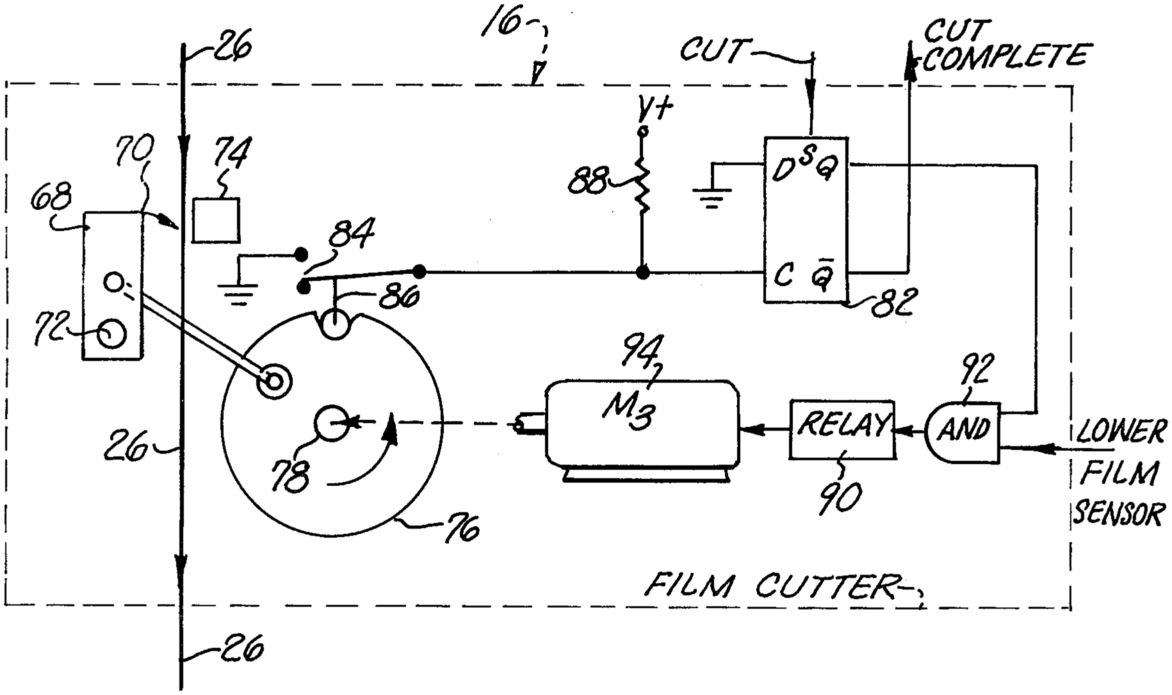
Figure 4:
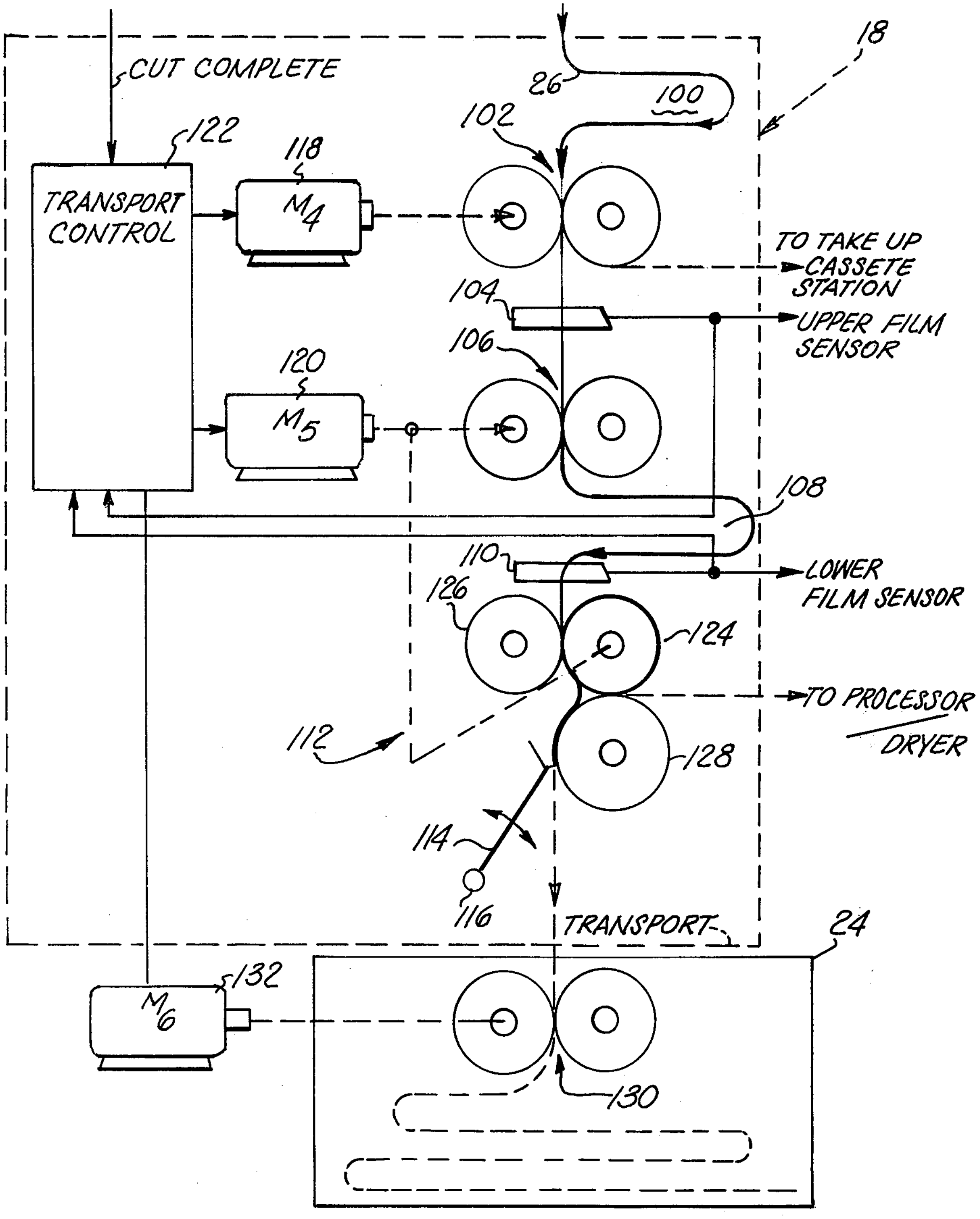
Figure 6:
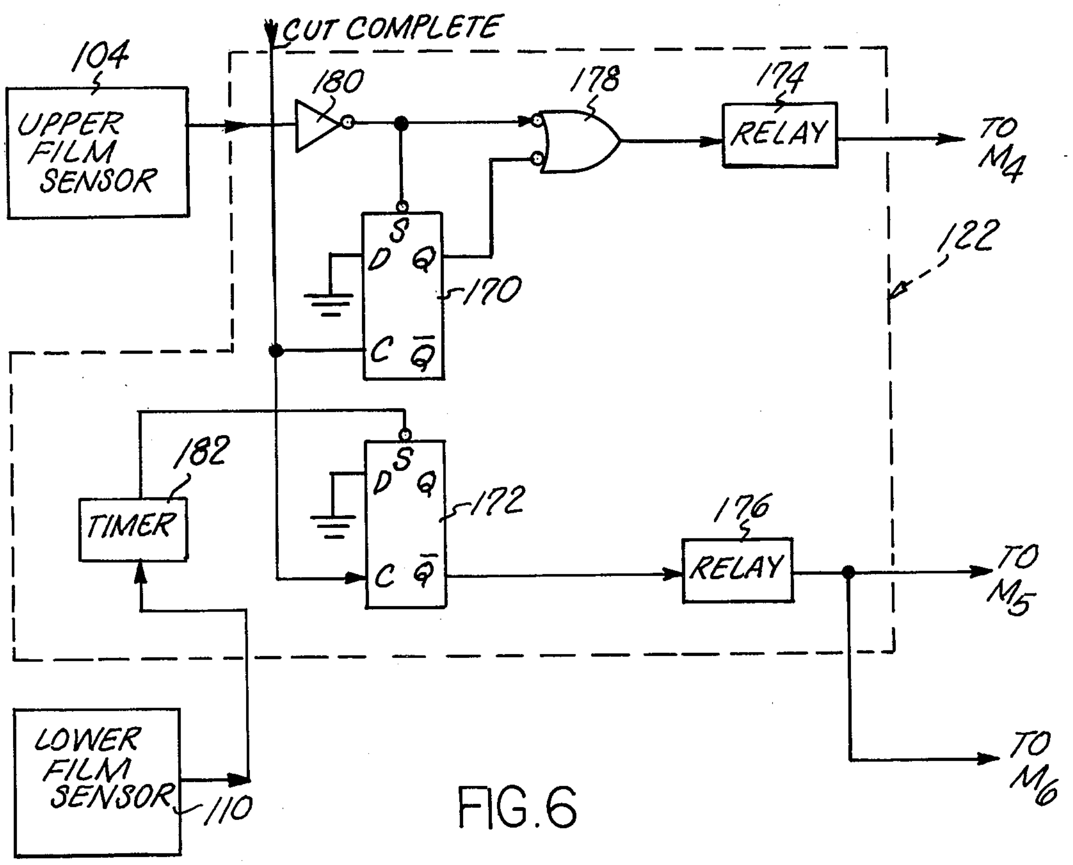
Figure 5:
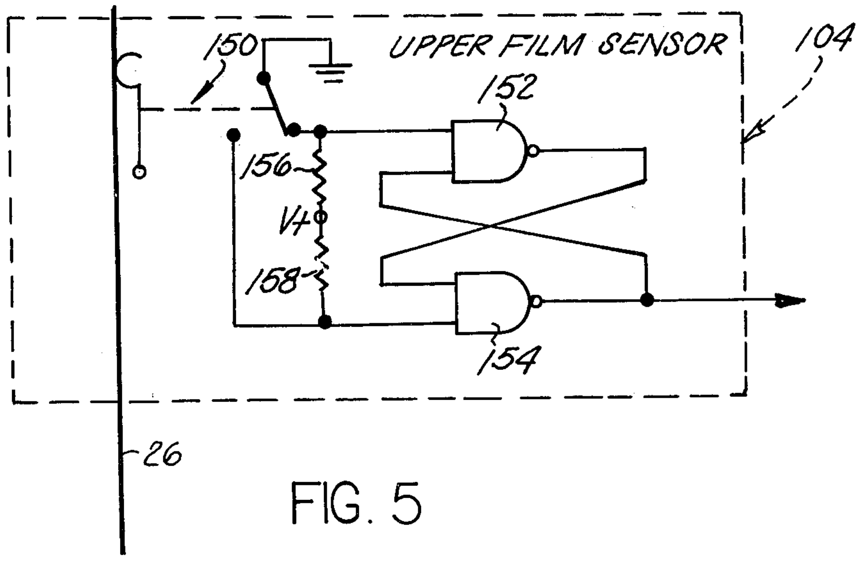

The foregoing and other objects and advantages of the invention will become readily apparent from the following description of the preferred embodiment of the invention as taken in conjunction with the accompanying drawings which are a part hereof and wherein:

FIG. 1 is a block diagram of a complete phototypesetting system,

FIG. 2 illustrates a film supply station for use with the system illustrated in FIG. 1, FIG. 3 illustrates a film cutting station for use with the system illustrated in FIG. 1, FIG. 4 illustrates a transport mechanism for use with the system of FIG. 1, FIG. 5 schematically illustrates a film sensor for use with the system illustrated in FIG. 1, and FIG. 6 schematically illustrates a control circuit for the transport mechanism set forth in FIG. 4.

Referring now to FIG. 1 the system is comprised generally of a film supply station 10, cathode ray tube (CRT) scanning station 12, drive station 14, film cutter station 16, transport mechanism 18, and three output stations 20, 22, and 24.

The film 26 exits from film supply station 10, is redirected by idler wheel 28, passes by film sensor 30, and enters the typesetting station 12. The end-of-film (EOF) sensor 30 is included to sense a low-film-supply condition and to inform the operator thereof. This is accomplished by directing infrared light at the film. The roll of film contained in film supply station 10 has a series of holes located near the end of the roll, which, when passing sensor 30, allow the infrared light to pass through the film to a reflective surface 31 which returns the light to the sensor. The sensor 30 responds to the return of light by providing a signal EOF for informing the operator of the low-film-supply condition.

Automatic phototypesetting stations are well known in the art and are not the subject of the present invention. Generally, these stations include cathode ray tubes, intricate lens means, and sophisticated control circuitry. For these reasons, the phototypesetting station will not be described in further detail, but is instead represented as a block in FIG. 1. For the purpose of this disclosure, this block is depicted as having an input responsive to an upper film sensor signal, an output for issuing a cut command to the film cutter 16, and a film drive output for controlling the motion of the film past the scanning station.

The film drive output of the scanning station is directed to motor 32 which is driveably connected to drive sprocket 34. Drive sprocket 34 has a series of cogs about its perimeter which contact corresponding holes along an edge of film 26. The film is held firmly against the drive sprocket by pressure rollers 36. With the system oriented as shown in the illustration, the motion of the film as controlled by drive sprocket 34 is in a generally downward direction, but may reverse itself to meet the dictates of the phototypesetting station. The motion of film in these directions is known in the art as foward and reverse leading, respectively.

Film cutter 16 is interposed between drive station 14 and transport station 18. When operated in one mode, film cutter 16 functions to separate exposed portions of the film from the continuous roll of film. These separated sections are then directed by the transport mechanism to either processor/dryer 22 or receiver box 24. The upper and lower film sensor outputs of transport mechanism 18 indicate the position of the severed portion of film within the transport mechanism, and serve as control lines for film cutter 16 and CRT scanning station 12. In a second mode, referred to herein as the cassette to cassette mode, film cutter 16 is disabled and the film passes through the transport mechanism into a take-up cassette station 20.

Referring now to FIG. 2, film supply station 10 is shown in greater detail. A film cassette 42 is provided which contains a continuous roll of film 44, a drive roller 46, and output rollers 48. The film exits from cassette 42 through rollers 48, which provide a light tight seal so that the cassette may be conveniently installed and removed in ordinary room lighting. The film 26 then passes over a tight-film bail 50 which is pivotably attached to an axis 62. A spring 54 is connected between a rigid frame member 56 and tight-film bail 50 to impart tension to the film by holding film bail 50 firmly against the film 26. A potentiometer 58 has a wiper arm which is coaxially affixed to film bail 50 such that the wiper arm rotates along with film bail 50 in response to changing film tension. Potentiometer 58 is connected between a B+ and B− supply. The output of potentiometer 58 thus provides a voltage level indicative of the position of film bail 50. Because of the connection to spring 54, the position of film bail 50 is directly related to the amount of tension on film strip 26. Servo amp 60 responds to the voltage produced by potentiometer 58 to produce a control signal for motor 62 which serves to pay out or pull in film from cassette 42 in response thereto.

If, for example, CRT station 12 directs drive sprocket 34 to begin reverse leading, spring 54 will relax and the tension on film strip 26 will be reduced. Since both film bail 50 and potentiometer 58 will thus rotate, the voltage level produced by the potentiometer 58 will change. In response to this changing voltage, servo amp 60 will direct motor 62 to begin pulling in film. As the film is pulled back into cassette 42, film bail 50 will return to its previous position, thus causing the potentiometer voltage to return to its first value. In this manner the tension on film strip 26 is maintained at a fixed level.

Take-up cassette station 20 is substantially identical to supply station 10. By controlling the paying out and pulling in of film from the cassettes with separate servo systems, the loading of drive motor 32 is reduced, thus allowing more rapid and accurate control of the position of the film.

Film cutting station 16 will be described in greater detail with reference to FIG. 3. The film cutter is comprised of a cutting member 68 which has a sharp cutting edge 70. The cutting member 68 is pivotably attached to axis 72 in such a manner that cutting edge 70 is free to rotate past the film plane and thereby sever a section from the film along the edge of end block 74. The cutting action of cutting member 68 is controlled by cam 76 which rotates about an axis 78. The cam is connected to cutting member 68 through a lever arm 80 so that the cutting member 68 cycles through one complete cutting action for a single rotation of cam 76.

Control of the cutter is provided by a type "D" flip-flop 82. The clock input to flip-flop 82 is connected to ground through a switch 84. Switch 84 is connected to a cam follower 86 which rides on the perimeter of cam 76. A notch on the perimeter of cam 76 allows cam follower 86 to deenergize switch 84 when the cutter is not in use. For all other positions of rotation of cam 76, switch 84 is energized. The clock input to flip-flop 82 is also connected to a V+ supply voltage through resistor 88; therefore, the clock input is held at a high level unless switch 84 is actuated. The Q output of flip-flop 82 is connected to a relay 90 through AND gate 92 which serves to gate the output of the flip-flop to the relay in accordance with a control signal provided by the lower film sensor in the transport mechanism. The purpose of this gate will be described in greater detail as this disclosure is more fully made. Relay 90 controls the application of power to motor 94. Motor 94, in turn, controls the action of the cutting member 68 by rotating the cam member 76.

In operation, a cut command is received on the SET input to flip-flop 82. This sets the Q output at a high level which normally activates motor 94 through AND gate 92 and relay 90. Motor 94 begins the rotation of the cam member 76 through the cutting cycle. As the cam member leaves it static position, switch 84 activates, thus connecting the clock input of flip-flop 82 to ground. This does not trigger a change in states of flip-flop 82, which triggers on rising edges. When the cutting cycle has been completed, cam follower 86 returns to the notch in the perimeter of cam member 76. This deactivates switch 84 and allows the clock input of flip-flop 82 to rise to a high level. This rising edge triggers flip-flop 82, causing the Q output to drop low and the cut-complete, or Q, output of flip-flop 82 to go high.

Referring now to FIG. 4, the transport apparatus will first be described with reference to the mode for transporting individual strips of film. In this mode, strips are severed from the roll of film by cutter station 16 and sent through an upper loop storage area 100, past upper pinch rollers 102, upper film sensor switch 104 and intermediate pinch rollers 106, and into the lower loop storage area 108. From the lower loop storage area 108, the film passes through a lower film sensor switch 110 and into the film gating mechanism 112. The gate 112 serves to direct the film to either processor/dryer 22 or receiver box 24 in accordance with the position of folder blade 114. Folder blade 114 may be rotated about an axis 116 to either of two switchable positions. Selection of one or the other of these positions may be accomplished either manually or automatically through means of a rotary solenoid (not shown).

In operation, the film is first threaded out of film cassette 42, over tight-film bail 50, around idler wheel 28, past EOF sensor 30, and into the CRT scanning station 12. From there the film is directed through sprocket drive station 14, film cutter station 16 and into transport mechanism 18. In the transport mechanism, the film is threaded down into pinch rollers 102 until it reaches upper sensor switch 104. CRT scanning station 12 may begin setting the first galley then, thus feeding film in a generally downward direction past the film cutter station and into the transport mechanism. Upper pinch rollers 102 are not energized during this period. Since the leading edge of the film is held securely between pinch rollers 102, the upper loop 100 begins forming. Because of the natural tendency of the film to curl about the side upon the emulsion is deposited, the direction in which the loop will begin forming is easily determinable. The inclusion of an upper storage loop allows the transport apparatus to be used with a scanning station which has provisions for forward and reverse leading. Since, until each galley is completed, the film rests freely in the upper loop storage area, the scanning station is capable of returning to any given spot on a galley during the typesetting thereof. Scanning station 12 keeps track of the length of each galley to insure that the capacity of upper loop storage area 100 is not exceeded. After the last line of type has been set in a galley, scanning station 12 operates sprocket drive 14 so as to move the last portion of typeset material past the film cutter station. A CUT command is then issued to the film cutter which severs the typeset portion from tbe remaining film in the manner previously described. During the cycling of the film cutter the cut-complete output of film cutter 16 drops to a low level, indicating that the cutter is busy. At the completion of the cut cycle the cut-complete output returns to a high level, thus signaling transport mechanism 18 to move the film out of the upper loop storage area. Film motion is controlled by electric motors 118 and 120 which are in turn controlled by transport control 122. Transport control 122 responds to the rising edge on the cut-complete line by energizing motors 118 and 120.

These motors are respectively coupled to pinch rollers 102 and 106 which transport the severed portion of film from the upper loop storage area into the lower loop storage area where it is received by film gate 112. Film gate 112 is composed of a drive roller 124, two pressure rollers 126 and 128, and folder blade 114. Rollers 106 and 124 are driven by the same motor. A series of gears is provided between them so that pinch rollers 106 may be operated in a high speed mode while roller 124 directs the film out of the transport mechanism at the speed required by the processor/dryer or receiver box. Because pinch rollers 106 operate at a high rate of speed, the film is quickly ejected from the upper loop storage area, thus freeing it for the next galley. The inclusion of a lower loop storage area allows the transport apparatus to interface between the high speed requirements of the CRT scanning station and the low speed requirements of the processor/dryer or receiver box. The film gating mechanism 112 receives the film and directs it to either processor/dryer 22 or receiver box 24. After passing through the lower film sensor 110, the leading edge of the film passes between drive roller 124 and pressure roller 126. Unless intercepted by folder blade 114, the receiver box will in due course receive the film.

Receiver box 24 has pinch rollers 130 which are driven by motor 132 at a speed slightly in excess of the speed of drive roller 124. This insures that the film will not pile up therebetween.

If the folder blade is actuated, it intercepts the leading edge of the film and obstructs movement thereof into receiver box 24. The film will then buckle between folder blade 114 and rollers 124 and 126. The direction in which the film will buckle will, of course, be known due to the previously mentioned tendency of the film to curl towards the emulsion side. Also, film guides may be used, as is standard practice, to restrict movement of the film in the unwanted direction so as to thereby further insure that the film will buckle in the proper direction. The buckled portion of film is pinched between rollers 124 and 128 and directed into the processor dryer 22. In doing this, the leading edge of the severed portion of film is folded along the buckled portion. This is done to prevent problems associated with the curling of film about certain mechanical elements of the processor/dryer.

The upper film sensor responds to the passage of the trailing edge of the severed portion of film therethrough by informing the CRT scanning station 12 that the upper loop storage area is clear. Scanning station 12 causes motor 32 to lead film into rollers 102. Upon the film reaching the upper film sensor 104, transport control 122 deactivates motor 118.

When the system is operated in the cassette to cassette mode, rollers 102 are separated so that the film is no longer drivingly coupled therebetween. The film is then fed directly into the take-up cassette station 20, which serves to receive the film as it is typeset. In this mode the film cutter station is never actuated, of course.

The upper film sensor 104 is shown in FIG. 5 and includes micro switch 150 and two NAND gates 152 and 154 which are cross-coupled in a bistable flip-flop arrangement. Micro switch 150 connects the remaining input of either one or the other of the NAND gates to ground, depending on the presence or absence of film. These inputs are also connected to a V+ supply through resistors 156 and 158. When there is film passing through the sensor station, micro switch 150 is tripped, thus connecting the input of NAND gate 152 to ground. This forces the output of NAND gate 154 high. When there is no film present, the input to NAND gate 154 is tied to ground, thereby triggering the flip flop into the alternate mode. Lower film sensor 110 is substantially identical to upper film sensor 104.

Operation of pinch rollers 102 and 106 is controlled by transport control circuit 122, shown in greater detail in FIG. 6. The transport control circuit is comprised of two type "D" flip-flops 170 and 172, respective relays 174 and 176, a two input NAND gate 178, inverter 180, and a timer circuit 182. The transport control circuit is responsive to the cut-complete output of cutter 16 and the outputs of upper film sensor 104 and lower film sensor 110.

As a galley is being set by scanner station 12, the Q outputs of flip flops 170 and 172 are both at a high level. Following the completion of the galley, a cut command is issued and executed in the manner previously described. The cut-complete output of cutter 16 drops to a low level during a cutting cycle and returns to a high level thereafter. The rising edge produced on the cut complete line at the completion of the cutting cycle triggers both flip-flop 170 and 172. The Q output of flip-flop 170 drops to a low state, thereby triggering relay 174 through NAND gate 178. The Q output of flip-flop 172 switches to a high level, directly energizing relay 176. Relays 174 and 176 serve to activate motors 118, 120 and 132 which then transport the film from the upper loop storage area into the lower loop storage area.

When the trailing edge of the film clears the upper film sensor 104, the output thereof rises to a high level and the output of inventor 180 drops to a low level. This sets the Q output of flip-flop 170 to a high state. Relay 174 remains energized, however, as long as the output of inverter 180 is at a low level. The output of upper film sensor 104 also informs CRT scanning station 12 that the upper loop storage area is clear. The CRT scanning station responds by directing motor 32 to feed more film into transport 18. The film is fed through rollers 102 and into the upper film sensor 104 which causes the output of the sensor to return to a low level. This low level signal is inverted by invertor 180 to provide a high output signal. Since neither of the inputs to NAND gate 176 is low, the output of the gate is also low and rollers 102 cease driving the film. Scanning station 12 then proceeds to set the next galley.

The film in the lower loop is slowly fed into either the processor/dryer or the receiver box. When the trailing edge of the film passes through lower film sensor 110, the output thereof changes from a low level to a high level, thus triggering timer 182. Timer 182 responds by producing an output pulse after a fixed time interval has elapsed. This output pulse resets flip-flop 172 thus disabling relay 176 and motors 120 and 132. The delay introduced by timer 182 is provided to insure that the entire galley has been fed past film gate station 112 and into the selected output before the motors are disabled.

If at the time the next cut pulse occurs, the trailing edge of the previous galley has not cleared the lower film sensor 110, the action of the cutter will be delayed. When the previous galley does so clear the sensor, the cutter will cycle and normal operation will be resumed. Thus, as described previously, the lower film sensor output is fed into an AND gate 92 together with the output of flip-flip 82 to control the occurrence of the cutting cycle.

Although the invention has been described in conjunction with a preferred embodiment, it is to be appreciated that various modifications and the arrangement of parts may be made without departing from the spirit and scope of the invention a defined by the appended claims.

We claim:

1. Transport apparatus for use with photocomposition means which, upon receipt of an indication, controllably exposes individual strips of film, said apparatus comprising:

a first film buffer adapted to receive each of said strips from said photocomposition means as it is produced and for retaining said strip until the entire said strip is produced by said photocomposition means, film advance means for grasping the leading portion of each of said strips as it is fed to said first film buffer, for holding said leading portion substantially stationary until the entire said strip is produced by said photocomposition means, and for transporting each of said strips from said first film buffer to a second film buffer upon the completion of each of said strips by said photocomposition means, a second film buffer for receiving each of said strips from said first film buffer and controllably feeding said strips into a first output means, and first output means for receiving said strips from said second film buffer, wherein said film advance means further includes sensor means for sensing when said leading portion is being held by said film advance means, and for then indicating to said photocomposition means that the controlled exposure of said strip may begin.

2. Apparatus as set forth in claim 1, wherein said film advance means comprises:

first and second rollers located between said first and second buffers and positioned adjacent one another so as to define a nip therebetween for receiving said film strips;

a motor operatively associated with said rollers for, when energized, causing said rollers to drive said film from said first buffer to said second buffer;

a sensor located along the film path between said second buffer and said rollers, and substantially adjacent to said rollers, for determining whether a strip of film is present at that point in the film path and for providing a signal indicative thereof, whereby said signal indicates whether a strip of film is being grasped by said rollers and also indicates whether a completed film strip has entirely passed beyond said rollers and into said second buffer; and control means responsive to said photocomposition means and to said sensor signal for, upon receipt of a signal from said photocomposition means indicating that a said film strip has been completed, energizing said motor until said sensor signal has indicated that the completed film strip has entirely passed beyond said rollers and into said second buffer and that the succeeding said strip of film has been grasped by said rollers and has reached the sensor, whereby said motor is energized for a period long enough so that said rollers will grasp and hold the leading portion of the succeeding film strip.

3. Photocomposition apparatus, comprising:

film supply means for supplying a continuous strip of unexposed film;

photocomposition means for controllably exposing said continuous strip of unexposed film as said film is fed therepassed;

first film advance means for feeding said film at a controlled rate past said photocomposition means;

film cutter means located downstream of said photocomposition means and controllable to sever individual strips of controllably exposed film therefrom;

first film buffer means adapted to receive each of said individual strips of controllably exposed film from said first film advance means and having a storage capacity great enough to permit substantially the entire length of one of the individual strips of controllably exposed film to be held therein;

second film buffer means for receiving each of said individual strips of controllably exposed film from said first film buffer means and for feeding said strips into a film processor means at a constant rate, said second film buffer also having a storage capacity great enough to permit substantially the entire length of one of said individual strips to be held therein;

second film advance means located intermediate said first and second film buffer means for transporting said individual strips of controllably exposed film from said first film buffer means to said second film buffer means;

film processor means for receiving each of said individual strips from said second film buffer at said constant rate, and for processing said film; and, means for preventing said first film advance means from transporting a said individual strip of controllably exposed film from said photocomposition means into said first film buffer means until after said first film buffer means is clear of film, and for preventing said second film advance means for transporting said individual strip of controllably exposed film from said first film buffer means into said second film buffer means until after said second film buffer means is clear of film, whereby said first and second film buffer means will each contain no more than one said individual strip of film at any given time, and that the processing of a said strip of controllably exposed film by said processing means will not interfere with the controllable exposure of the next succeeding strip of film by said photocomposition means.

4. Photocomposition apparatus as set forth in claim 3, wherein said control means includes means for preventing said photocomposition means from controllably exposing said film until after the leading edge of said film is grasped by said second film advance means, and for, after said leading edge is grasped by said second film advance means, preventing said second film advance means from feeding said film into said second film buffer means until after the controllable exposure of said strip by said photocomposition means has been completed, whereby any portion of said strip previously exposed by said photocomposition means may be repositioned by said first film advance means at said photocomposition means for further exposure, even though said leading edge is grasped by said second film advance means.

5. Photocomposition apparatus as set forth in claim 3, and further comprising a receiver box for receiving and holding said individual strips of controllably exposed film for later processing, and directing means interposed between said second film buffer means and said processing means for selectively directing said individual strips of controllably exposed film to either said processor means or said receiver box means, whereby said photocomposition apparatus may be used to provide said individual strips of controllably exposed film even when said film processing means is unavailable for immediate processing of said film.

* * * * *